(12) United States Patent
Kim et al.

(10) Patent No.: US 9,019,238 B2
(45) Date of Patent: Apr. 28, 2015

(54) OBJECT-SENSING DEVICE

(75) Inventors: Jin-Hwan Kim, Suwon-si (KR);
Seong-Mo Hwang, Seongnam-si (KR);
Seung-Ho Nam, Seongnam-si (KR);
Jee-Hong Min, Seongnam-si (KR);
Won-Ki Hong, Suwon-si (KR)

(73) Assignee: Samsung Display Co., Ltd. (KR)

( * ) Notice: Subject to any disclaimer, the term of this patent is extended or adjusted under 35 U.S.C. 154(b) by 626 days.

(21) Appl. No.: 12/914,888

(22) Filed: Oct. 28, 2010

(65) Prior Publication Data

US 2011/0234537 A1    Sep. 29, 2011

(30) Foreign Application Priority Data

Mar. 24, 2010 (KR) .................. 10-2010-0026311

(51) Int. Cl.
*G06F 3/042* (2006.01)
*G06F 3/041* (2006.01)

(52) U.S. Cl.
CPC ............ *G06F 3/0412* (2013.01); *G06F 3/0421* (2013.01); *G06F 2203/04109* (2013.01)

(58) Field of Classification Search
CPC ................. G06F 2203/04109; G06F 3/0421; G06F 3/042; G06F 3/0425; G06F 3/0428
USPC .......... 345/173, 175; 178/18.01, 18.03, 18.09
See application file for complete search history.

(56) References Cited

U.S. PATENT DOCUMENTS

| | | | |
|---|---|---|---|
| 6,429,857 B1 | 8/2002 | Masters et al. | |
| 6,972,753 B1 | 12/2005 | Kiumura et al. | |
| 7,098,592 B2 * | 8/2006 | Nishikawa | 313/506 |
| 8,009,152 B2 * | 8/2011 | Kim et al. | 345/175 |
| 8,013,845 B2 * | 9/2011 | Ostergaard et al. | 345/176 |
| 2002/0067348 A1 | 6/2002 | Masters et al. | |
| 2006/0114237 A1 | 6/2006 | Crockett et al. | |
| 2006/0227120 A1 * | 10/2006 | Eikman | 345/175 |
| 2008/0029691 A1 | 2/2008 | Han | |
| 2008/0030484 A1 * | 2/2008 | Cho et al. | 345/176 |
| 2008/0284925 A1 | 11/2008 | Han | |
| 2008/0285310 A1 | 11/2008 | Aylward et al. | |
| 2009/0128508 A1 | 5/2009 | Sohn et al. | |
| 2009/0207145 A1 * | 8/2009 | Tsuzaki et al. | 345/173 |

(Continued)

FOREIGN PATENT DOCUMENTS

| | | |
|---|---|---|
| CN | 101510134 | 8/2009 |
| JP | 2005-235174 | 9/2005 |

(Continued)

OTHER PUBLICATIONS

European Search Report corresponding to European Patent Application No. 11151617.5, Feb. 11, 2015, 9 pages.

*Primary Examiner* — Stephen Sherman
(74) *Attorney, Agent, or Firm* — Innovation Counsel LLP

(57) ABSTRACT

An object-sensing device is presented. The device includes a waveguide and a substrate holding a liquid crystal layer, wherein radiation propagates through the waveguide via total internal reflection. A radiation emitting element is positioned along a radiation input surface of the waveguide, and a radiation receiving element is positioned to receive radiation exiting the waveguide. The radiation receiving element may be positioned across the waveguide from the radiation emitting element. Alternatively, the radiation receiving element may be positioned on a surface that contacts the radiation input surface of the waveguide that is optically coupled to the radiation emitting element.

24 Claims, 18 Drawing Sheets

(56) References Cited

U.S. PATENT DOCUMENTS

| | | | |
|---|---|---|---|
| 2010/0128006 A1* | 5/2010 | Shimizu | 345/175 |
| 2010/0283763 A1* | 11/2010 | Kim et al. | 345/175 |
| 2010/0302481 A1* | 12/2010 | Baum et al. | 349/96 |
| 2011/0043490 A1* | 2/2011 | Powell et al. | 345/176 |
| 2011/0304586 A1* | 12/2011 | Chia-Jui et al. | 345/175 |

FOREIGN PATENT DOCUMENTS

| | | |
|---|---|---|
| JP | 2005-316517 | 11/2005 |
| JP | 2006-155616 | 6/2006 |
| JP | 2006-318512 | 11/2006 |
| JP | 2007-042093 | 2/2007 |
| JP | 2008-181411 | 8/2008 |
| JP | 2008-293114 | 12/2008 |
| JP | 2009-110540 | 5/2009 |
| JP | 2009-187342 | 8/2009 |
| KR | 10-2008-0060127 A | 7/2008 |
| KR | 10-2009-0051613 A | 5/2009 |
| KR | 10-2009-0057542 A | 6/2009 |
| WO | 2006/134552 | 12/2006 |
| WO | WO 2007083883 A1 * | 7/2007 |
| WO | 2008/066004 A1 | 6/2008 |
| WO | 2010/024008 A1 | 3/2010 |

\* cited by examiner

OBJECT-SENSING DEVICE

CROSS-REFERENCE TO RELATED APPLICATION

This application claims priority to, and the benefit of, Korean Patent Application No. 10-2010-0026311 filed in the Korean Intellectual Property Office on Mar. 24, 2010, the entire contents of which are incorporated herein by reference.

FIELD OF INVENTION

The present invention refers generally to an object-sensing device and more particularly to an object-sensing (e.g., touch-sensing) display device.

BACKGROUND

An object-sensing device is a device capable of sensing the presence of an object, and sometimes determines the location of the object on the device. Incorporation of object-sensing capability into display devices is becoming increasingly desirable, as it allows the display device itself to also be used as a user input device, eliminating the need for cumbersome components such as keyboards, keypads, and mouse. Using an object-sensing display device, a user can, for example, touch images of buttons on the display to make a selection or type a word. Object-sensing display devices can be useful for applications such as automatic telling machines (ATMs), mobile/cellular phones, and personal digital assistants (PDAs).

There are a few different types of object-sensing devices. A resistive-type touch sensing display device senses a current change in response to the touch. A surface-wave-type touch sensing display device senses a supersonic change in response to the touch. A radiation-sensing-type display device typically includes a radiation emitting element and a radiation receiving element and senses a change in the intensity of the radiation when an object is present compared to when no object is present.

While the radiation-sensing-type display device is advantageous because of its large object-sensing area, it is desirable to lower its manufacturing cost.

SUMMARY

In one aspect, the invention is an object-sensing display device that includes a waveguide and a substrate holding a liquid crystal layer, wherein radiation propagates through the waveguide via total internal reflection. A radiation emitting element is positioned along a radiation input surface of the waveguide, and a radiation receiving element is positioned to receive radiation exiting the waveguide.

In another aspect, the invention is an object-sensing device that includes a waveguide that transmits radiation via total internal reflection from a first end to a second end, a radiation emitting element positioned at a first end of the waveguide, and a radiation receiving element positioned at a second end of the waveguide. Edges of the waveguide that do not correspond to the first end or the second end are free of radiation emitting element and radiation receiving element.

In yet another aspect, the invention is an object-sensing display device that incorporates the above object-sensing device. The display device includes a common electrode formed on the waveguide, and a thin film transistor array substrate having pixel electrodes formed thereon disposed on the common electrode with a liquid crystal layer between the pixel electrodes and the common electrode.

In yet another aspect, the invention is a computer-readable medium containing instructions for executing a method for determining the location of an object on a surface in an x-y plane. The method entails obtaining data regarding intensity of radiation at various points along an x-direction, and using a rate of intensity change in the x-direction to determine the y-coordinate of the object. The point of minimum intensity along the x-direction is used to determine the x-coordinate of the object.

BRIEF DESCRIPTION OF THE DRAWINGS

FIG. 17 is a cross-sectional view of an embodiment of the object-sensing display device.

DETAILED DESCRIPTION

As used herein, a first element "holding" a second element means the first element is playing a part in keeping the second element in its position such that removal of the first element would cause the second element to fall apart, spill, leak, or otherwise get displaced.

Figure 1:
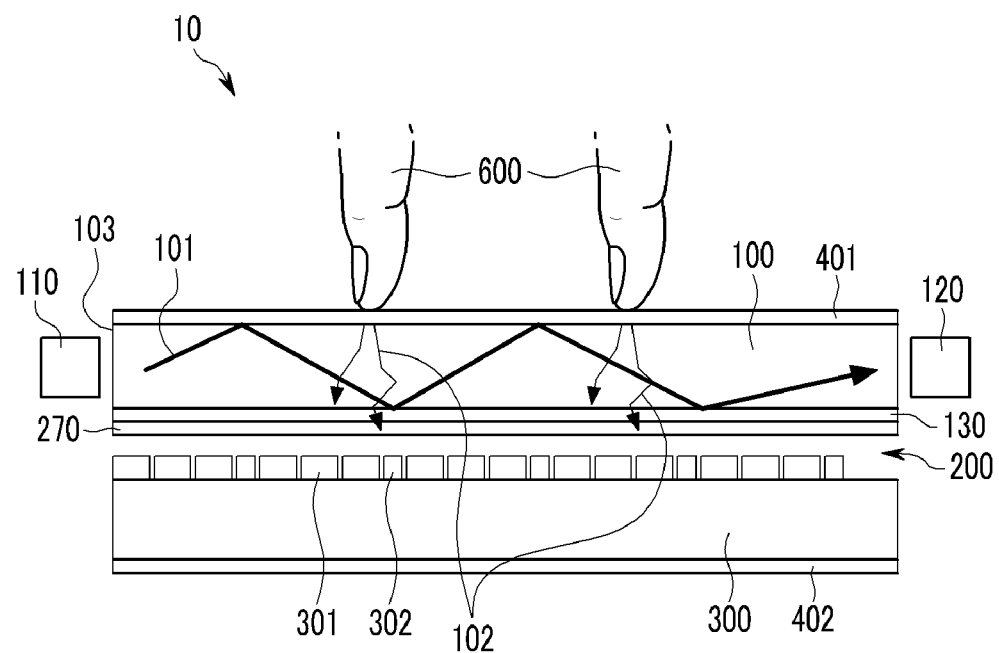
FIG. 1 is a cross-sectional view of an object-sensing display device in accordance with one embodiment of the invention.

FIG. 1 is a cross-sectional view of an object-sensing display device 10 according to a first embodiment of the invention. As shown, the object-sensing display device 10 includes a waveguide 100 and a thin film transistor (TFT) substrate 300 holding a liquid crystal layer 200. The waveguide 100 receives radiation at a radiation input surface 103, which is optically coupled to a radiation emitting element 110. The received radiation travels through the waveguide 100 (as shown by an arrow 101) and reaches a radiation receiving element 120 positioned on the other side of the waveguide 100. An upper polarizer 401 and a lower polarizer 402 are placed on the outermost surfaces of the waveguide 100 and the TFT substrate 300, respectively. A subsidiary layer 130 is formed on an internal surface of the waveguide 100 to reduce radiation leakage. A color filter layer 301 and a light blocking member 302 are formed on the TFT substrate 300.

Operational principles of a liquid crystal display of the type shown in FIG. 1 are well known. The TFT substrate 300 includes circuitry connecting gate electrodes, source electrodes, drain electrodes, storage electrodes, and pixel electrodes (none of which are shown). The pixel electrode may be formed on the color filter layer 301 and the light blocking member 302. A common electrode (270) is formed on the subsidiary layer 130. When voltage is applied to the pixel electrodes, an electric field forms in the liquid crystal layer between the pixel electrodes and the common electrode, changing the liquid crystal orientation and affecting light transmittance through the liquid crystal layer 200. A user, who is located close to the waveguide 100, views an image created by the light transmission. He can input information into the object-sensing display device 10 by touching certain parts of the image with an object 600 (e.g., his finger, a pen, a stylus).

The radiation emitted by the radiation emitting element 110, which may be infrared radiation, travels through the waveguide 100 via total internal reflection. The subsidiary layer 130 includes a material having a low index of refraction to help the radiation stay in the waveguide 100. When the object 600 is on the external surface of the waveguide 100 (e.g., touching the surface), it causes the radiation to scatter, frustrating the total internal reflection and causing some radiation to scatter and escape the waveguide 100. Scattered radiation 102 is shown in FIG. 1.

The radiation receiving element 120 receives a baseline level of radiation emitted by the radiation emitting element 110 when no object is present at the surface of the display device 10. When an object 600 is present, frustrated total internal reflection causes some radiation to escape the waveguide 100 before reaching the radiation receiving element 120, thereby lowering the level of radiation that reaches the radiation receiving element 120. The radiation receiving element 120 uses the amount by which the radiation level is reduced to determine the presence and the location of the object 600, as will be explained in more detail below.

Compared to display devices where the liquid crystal display has two substrates and a waveguide is added to the two-panel liquid crystal display to impart the object-sensing capability, the embodiment of FIG. 1 is slimmer, lighter, and less expensive to manufacture because there is one fewer substrate used. In the embodiment of FIG. 1, the waveguide 100 serves a dual function: one as a waveguide for object detection, and another as a liquid crystal display panel that is holding the liquid crystal layer 200.

Figure 2:
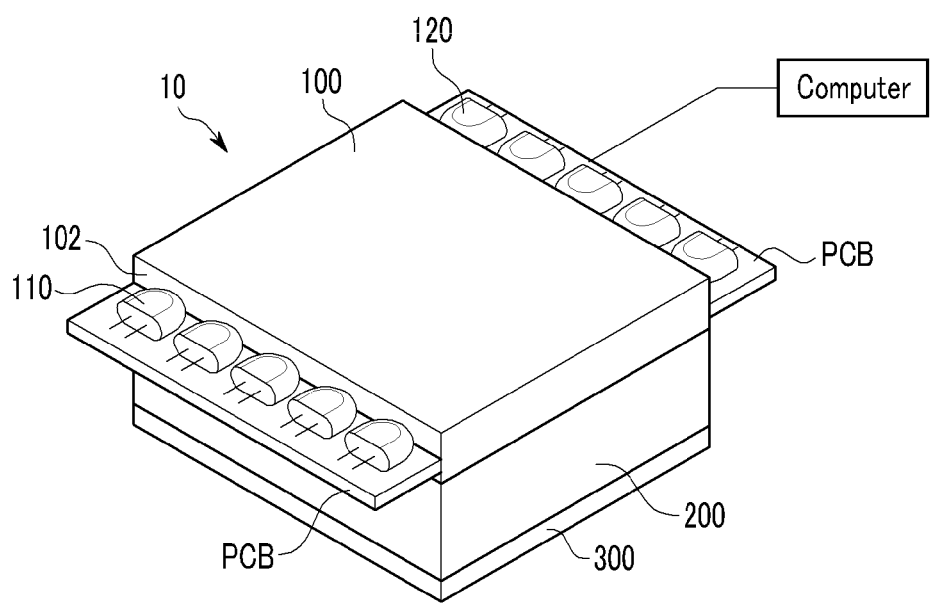
FIG. 2 is a perspective view of the object-sensing display device.

FIG. 2 is a perspective view of the object-sensing display device 10. The radiation emitting elements 110, positioned along the radiation input surface 103 of the waveguide 100, may be a series of infrared light emitting diodes (LEDs) or lamps mounted on a PCB. The wavelength of the emitted radiation may be between about 850 nm and about 980 nm. Preferably, the radiation emitting elements 110 contact the radiation input surface 103 such that there is no air gap between the radiation emitting elements 110 and the waveguide 100. The waveguide 100 is made of a material with a higher index of refraction than air, such as one of various organic materials, glass, or polymethyl methacrylate (PMMA, index of refraction=1.49). The thickness of the waveguide 100 may be about 0.1-10 mm. The radiation receiving elements 120 may be a series of infrared-sensitive photodiodes, charge-coupled devices (CCDs), phototransistors, image cameras, etc. mounted on another PCB. A computer is coupled to the PCB supporting the radiation receiving elements 120 to receive the amounts of radiation sensed by each of the radiation receiving elements 120 and determine the location of the object 600 (see FIG. 1).

Figure 3:
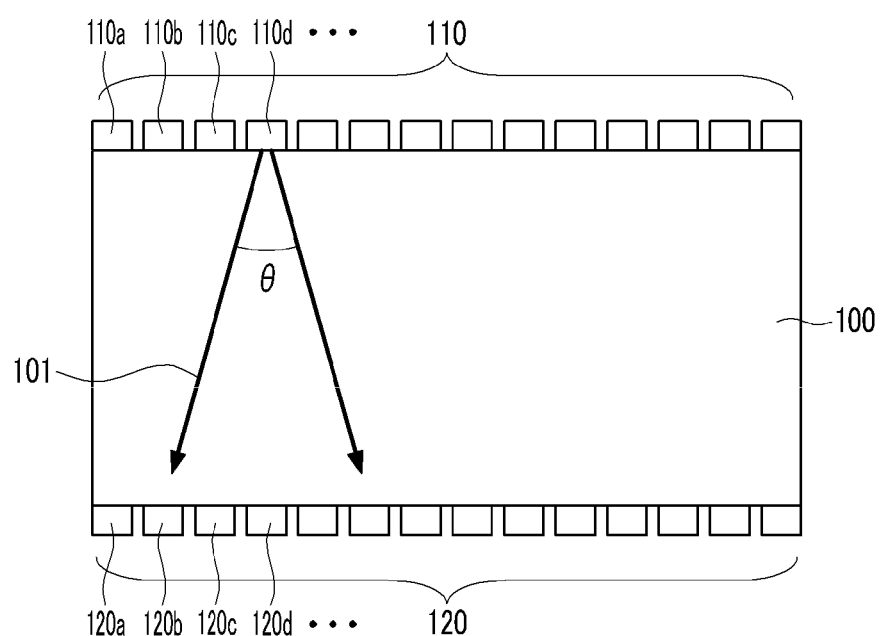
FIG. 3 is a plan view of an object-sensing device capable of being used with a display device.

FIG. 3 is a plan view of the object-sensing portion of the object-sensing display device 10. Usually, the number of radiation emitting elements 110 is equal to the number of radiation receiving elements 120. More specifically, the radiation emitting elements 110a, 110b, 110c, etc. correspond with radiation receiving elements 120a, 120b, 120c, etc. Normally, when no object is detected, the emitter-receiver pairs are scanned line by line at approximately 60 Hz. For example, the radiation emitting element 110a and the radiation receiving element 120a will be turned on, then the radiation emitting element 110b and the radiation receiving element 120b will be turned on, then 110c and 120c, etc. from one end of the waveguide 100 to the other. When an object is present during this normal scanning, one of the radiation receiving elements 120 (which will be referred to as radiation receiving element 120i) receives a reduced level of radiation. This detection of sub-baseline radiation level triggers a group of radiation receiving elements 120 around the radiation receiving element 120i to turn on simultaneously. The specific "group" of radiation receiving elements 120 that turn on may be determined based on which radiation receiving elements 120 fall inside the critical angle θ. The radiation is at its peak intensity at θ/2, and falls off to about 50% of the peak intensity at the outer limits of the angle. In some embodiments, the "group" may be all the radiation receiving elements 120. In other embodiments, the "group" that simultaneously gets turned on may be a predetermined number of radiation receiving elements 120 to the left and to the right of the radiation receiving element 120i. This invention is not limited to which and how many radiation receiving elements 120 are turned on in response to the initial detection of object presence.

FIGS. 4-8 illustrate the method by which the location of the object is determined using the signals from the radiation receiving elements 120. As mentioned above, when the presence of an object is detected, a group of radiation receiving elements 120 around the radiation receiving element 120i is turned on to get a "profile" of the radiation intensity. In FIGS. 4-8, the direction in which the radiation receiving elements 120 are aligned is referred to as the x-direction. The direction from a radiation receiving element to a corresponding radiation emitting element 110 is referred to as the y-direction.

The embodiments and methodology illustrated by FIGS. 3-8 are not limited to being used with a display device or a liquid crystal display, and may be adapted to non-display applications that incorporate object-sensing capability. The object-sensing device without the display portion would include the waveguide 100, the radiation emitting element 110, the radiation receiving element 120, and the computer for carrying out the location determination.

Figure 4:
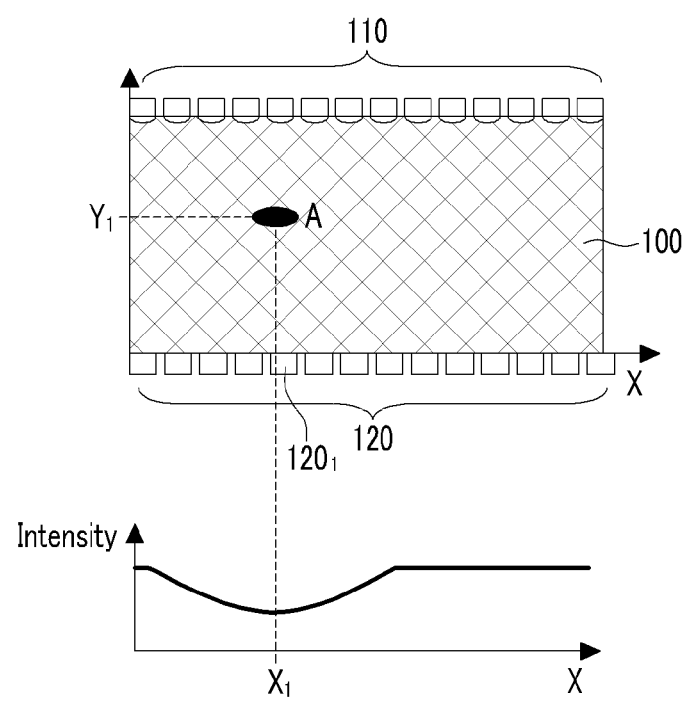
FIG. 4 shows the radiation intensity as a function of x when an object is at a location A of the object-sensing device.

FIG. 4 shows the intensity as a function of x when an object is at a location A of the object-sensing device. The flat portion of the plot indicates the baseline intensity, which is the radiation intensity detected by the radiation receiving elements 120 when no object is present. When an object is at location A, the radiation receiving element $120_1$ at location $x_1$ receives the least amount of radiation, since the object almost completely blocks the radiation from reaching it. Due to the spreading effect of radiation (see FIG. 3), the radiation receiving elements 120 around the radiation receiving element $120_1$ produce a parabolic intensity profile as shown in FIG. 4, with the stationary point (where slope=0) of the parabola being at $x_1$. The radiation receiving elements 120 that are farther away from the radiation receiving element $120_1$ are less affected by the presence of the object than the elements 120 that are closer. By looking for the stationary point of the parabola, the x-coordinate of the object can be determined.

Figure 5:
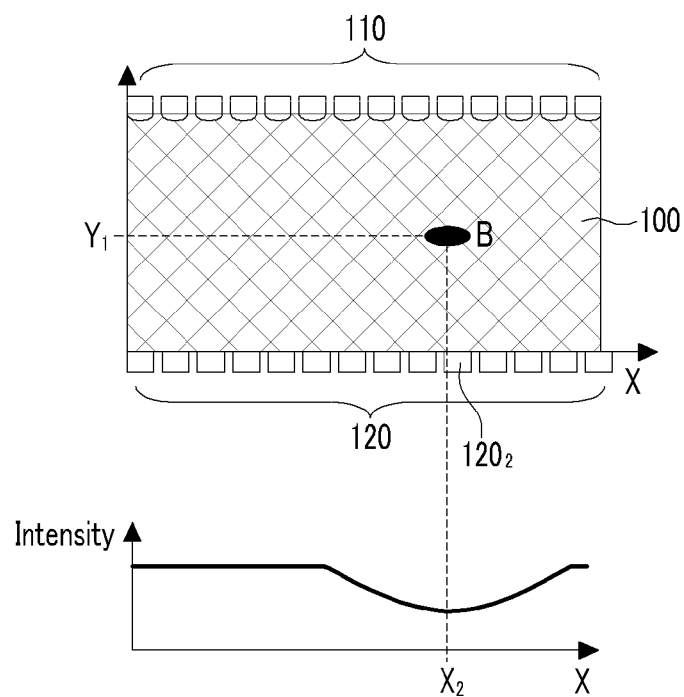
FIG. 5 shows the radiation intensity as a function of x when an object is at a location B on the object-sensing device.

FIG. 5 shows the intensity as a function of x when an object is at a location B of the object-sensing device. The location B has the same y-coordinate as the location A of FIG. 4, but is shifted in the x-direction. A radiation receiving element $120_2$ detects the lowest level of radiation, and the stationary point of the parabola is at $x_2$.

Figure 6:
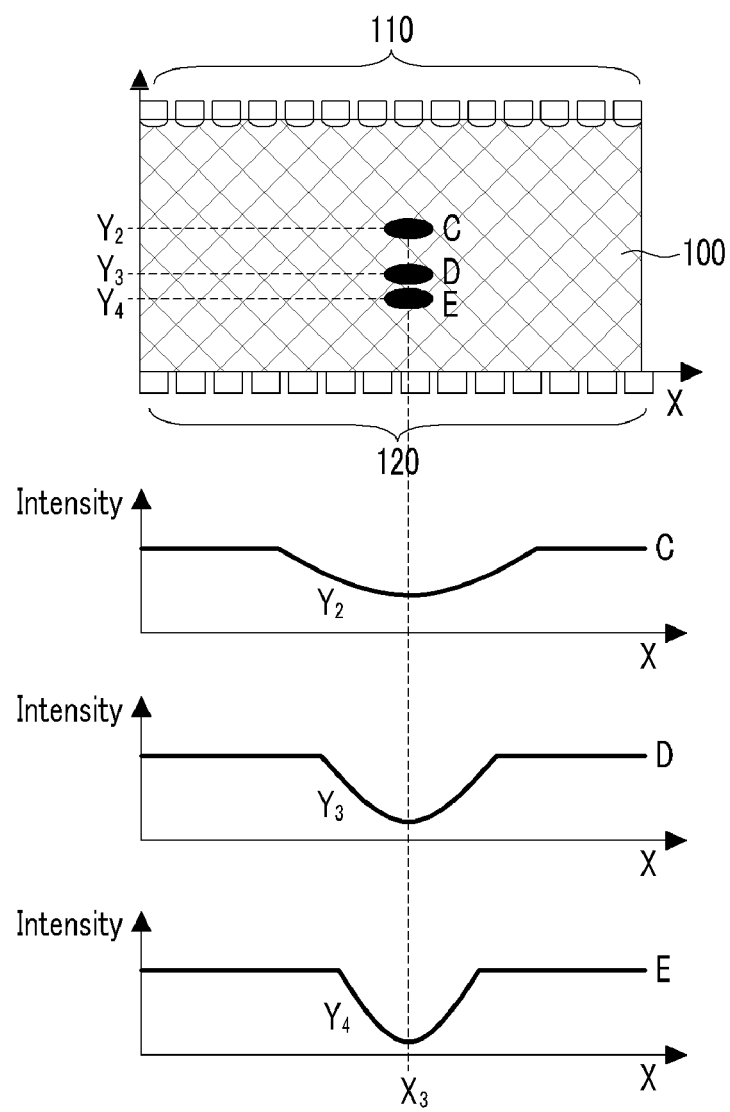
FIG. 6 shows the radiation intensity as a function of x under three scenarios: when an object at a location C, when an object at a location D, and when an object at a location E on the object-sensing device.

FIG. 6 shows the intensity as a function of x under three scenarios: when an object at a location C, when an object at a location D, and when an object at a location E of the object-sensing device. The three locations are all at the same x-coordinate but have different y-coordinates. As shown, the three locations produce parabolas with stationary points at the same point along the x-direction. However, the slopes of the parabolas differ depending on the y-coordinate. Due to the fact that radiation spreads in the manner shown in FIG. 3, an object that is closer to the radiation emitting element 110 blocks a greater portion of the total width of the radiation cone. However, because radiation has a longer distance to travel and spread after passing the object and reaching the radiation receiving element 120, the intensity at the stationary point is not as low as in the case where the object is closer to the radiation receiving element 120. Hence, the closer an object is to the radiation emitting element 110, the shallower the "dip" of the parabola will be and the less steep the slope will be. In the case of location E, which is closer to the radiation receiving element 120, the stationary point of the parabola is at a lower intensity than at locations C or D and the slope of the parabola is also steeper.

Figure 7:
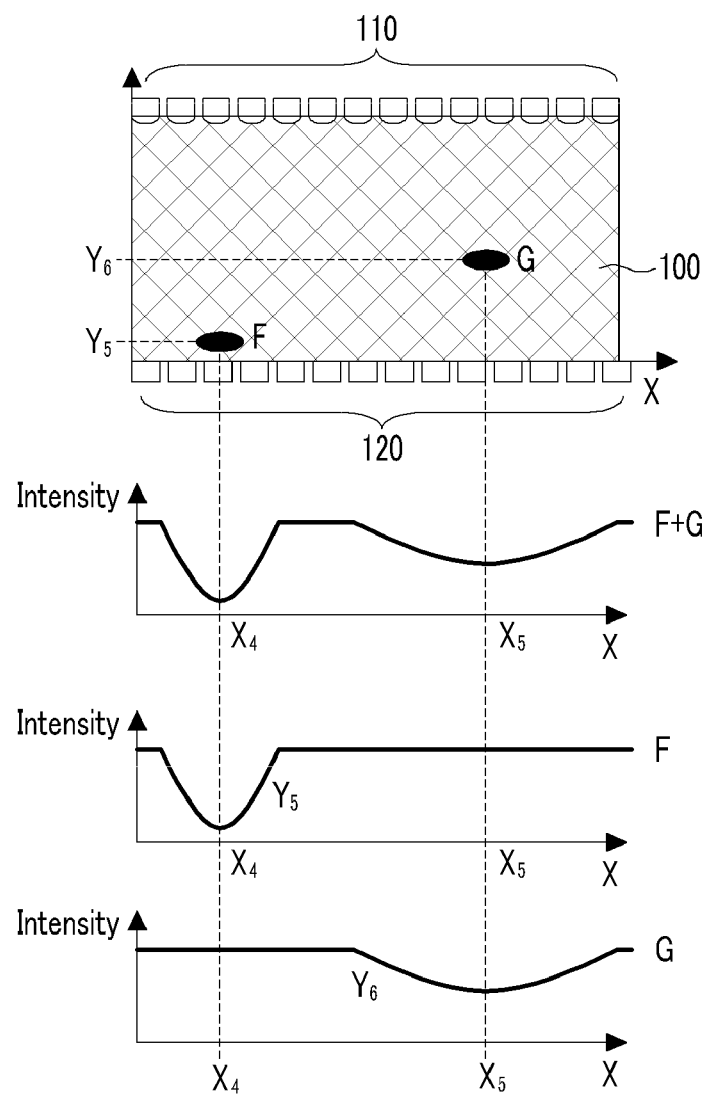
FIGS. 7 and 8 show the radiation intensity as a function of x in a "multi-touch" situation where multiple objects are on the object-sensing device at the same time.
Figure 8:
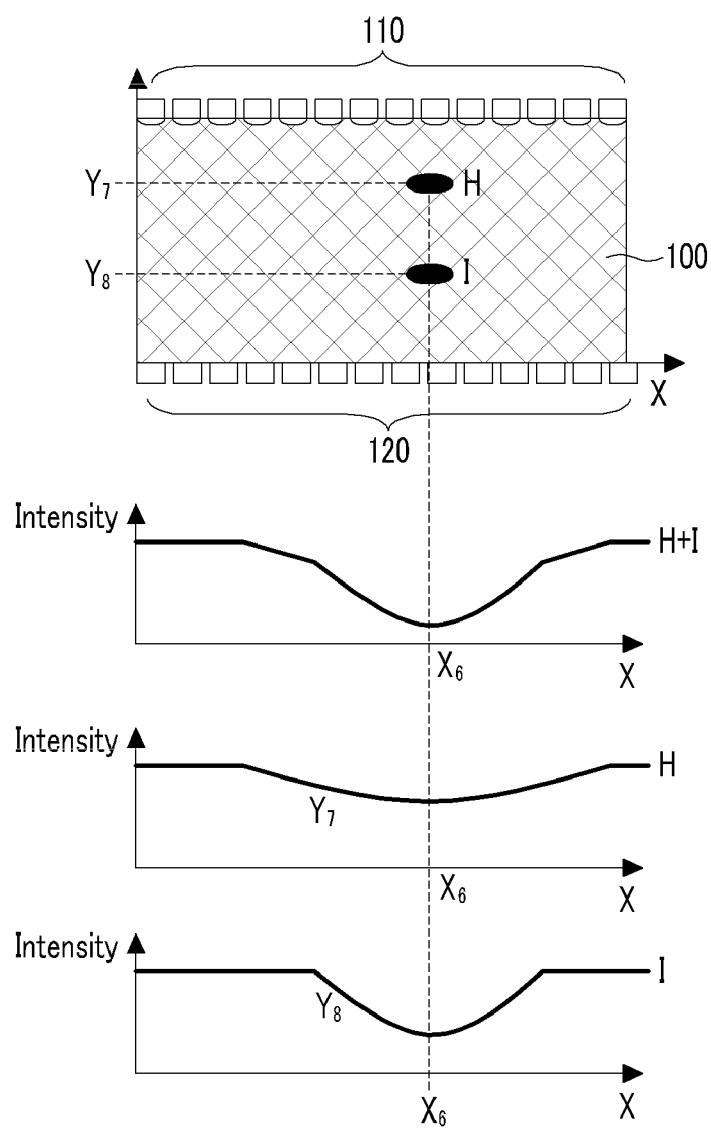

FIGS. 7 and 8 illustrate a "multi-touch" situation where multiple objects are on the object-sensing device at the same time. In the case of FIG. 7, there are two objects, one at location F and another at location G. Since the two locations have different x-coordinates and y-coordinates, the two parabolas have stationary points at different points along the x-direction and their slopes are also different. When there are multiple parabolas like this, the computer that determines the object locations separates the parabolas out as shown to determine the x- and y-coordinates of each object.

FIG. 8 illustrates a "multi-touch" situation where two objects are at the same x-coordinate, hence producing overlapping parabolas. In this case, the two parabolas have their stationary points at the same x-coordinate but have different slopes. Since the object that is closer to the radiation emitting element 110 will generate a wider parabola than the object that is farther from the radiation emitting element 110, the overlapped parabola will show two different slopes. Based on the two different slopes, the computer that is determining the object locations will separate out the two parabolas. Using the two parabolas, the x- and y-coordinates for both objects can be determined.

Figure 9:
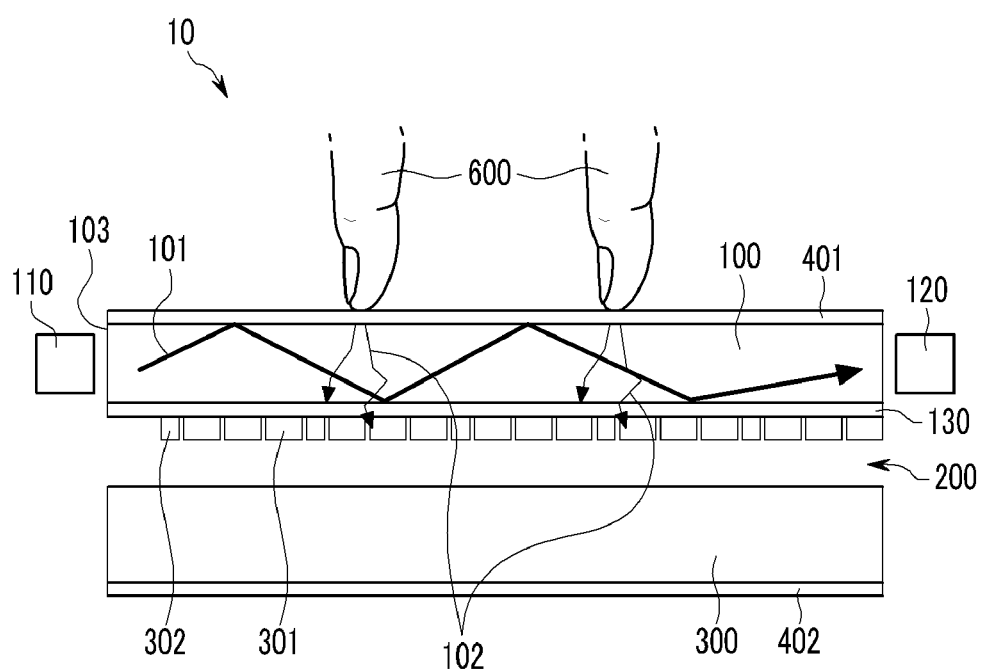
FIGS. 9-12, 14, 15, and 17 show different embodiments of the object-sensing display device.
Figure 10:
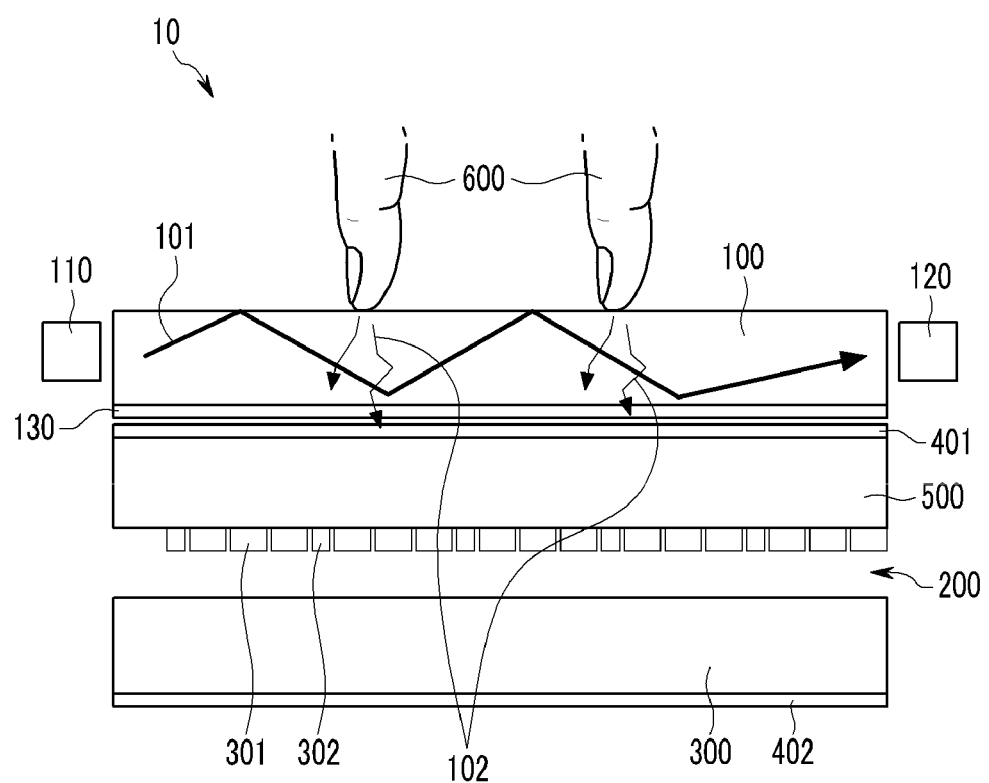
Figure 11:
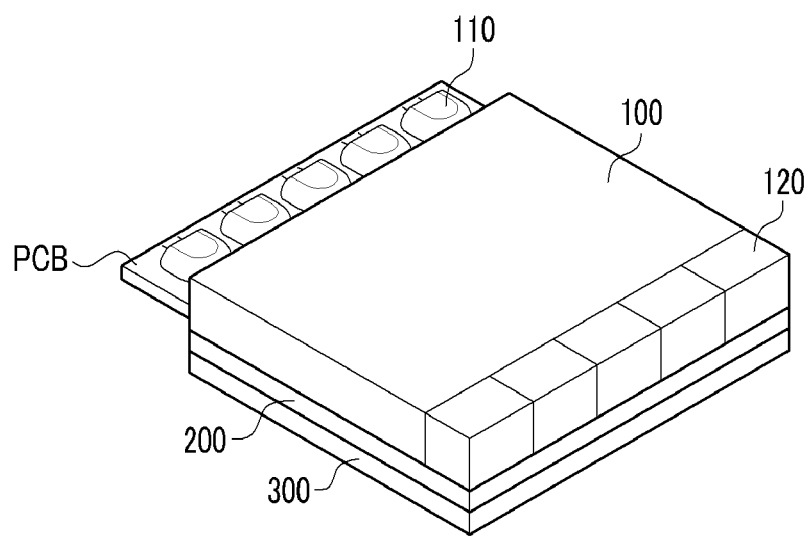

FIGS. 9-17 show different embodiments of the object-sensing display device 10. FIGS. 9, 10, and 11 show embodiments where the radiation receiving elements 120 are positioned across the waveguide 100 from the radiation emitting elements 110, as in the embodiment of FIG. 1. In these embodiments, the radiation receiving elements 120 detect the amount of radiation that is totally internally reflected through the waveguide 100. The method for determining the location of an object that is described in reference to FIGS. 4-8 may be applied to the embodiments of FIGS. 9, 10, and 11.

FIG. 9 is a cross-sectional view of a second embodiment of the object-sensing display device 10. The embodiment of FIG. 9 is similar to the embodiment of FIG. 1 except that the color filter layer 301 and the light blocking member 302 are formed on the waveguide 100 instead of the TFT substrate 300.

FIG. 10 is a cross-sectional view of a third embodiment of the object-sensing display device 10. Unlike the two-substrate embodiment shown in FIG. 1, this embodiment has a waveguide on top of a liquid crystal display that has two substrates. More specifically, an intermediate substrate 500 and the TFT substrate 300 are holding the liquid crystal layer 200 in this embodiment. The waveguide 100 is placed on top of the liquid crystal device but does not play a role in holding the liquid crystal layer 200. The color filters 301 and the light blocking members 302 are formed on the intermediate substrate 500. The subsidiary layer 130 is formed on the internal surface of the waveguide 100 to ensure total internal reflection. The upper polarizer 401 is formed between the subsidiary layer 130 and the intermediate substrate 500. A common electrode (not shown) is formed on the color filters 301 and the light blocking member 302.

FIG. 11 is a cross-sectional view of a fourth embodiment of the object-sensing display device 10. This embodiment is similar to the embodiment of FIG. 2, except that the radiation receiving elements 120 are formed directly on the waveguide 100 through a photolithography and fabrication process instead of being mounted on a PCB and being optically coupled to a waveguide surface.

The embodiments of FIGS. 12-17 have radiation receiving elements 120 positioned on a surface of the waveguide 100 that contacts the radiation input surface 103. Typically, when the waveguide 100 is a rectangular block, these surfaces are perpendicular to the radiation input surface 103. In the embodiments of FIGS. 11-17, the radiation receiving elements 120 detect the amount of scattered radiation 102.

The radiation receiving element 120 of FIGS. 12-17 may be a photodiode, a photo-transistor, CCD, etc. and may be formed via a thin film transistor fabrication process. When thin film process is used to form the radiation receiving element 120, photolithography and thin film deposition techniques may be used. The radiation receiving element 120 is preferably formed in a light blocking area so that it will not decrease the aperture ratio of the device. By forming the radiation receiving element 120 through thin film process, manufacturing cost may be decreased compared to the embodiments where they are mounted on a PCB and coupled to the waveguide 100.

Disposing the radiation receiving element 120 on the waveguide 100 may result in a smaller object-sensing display device 10 compared to disposing the radiation receiving elements 120 on a side of the waveguide 100 (as in the embodiments of FIGS. 1 and 9-11).

Figure 12:
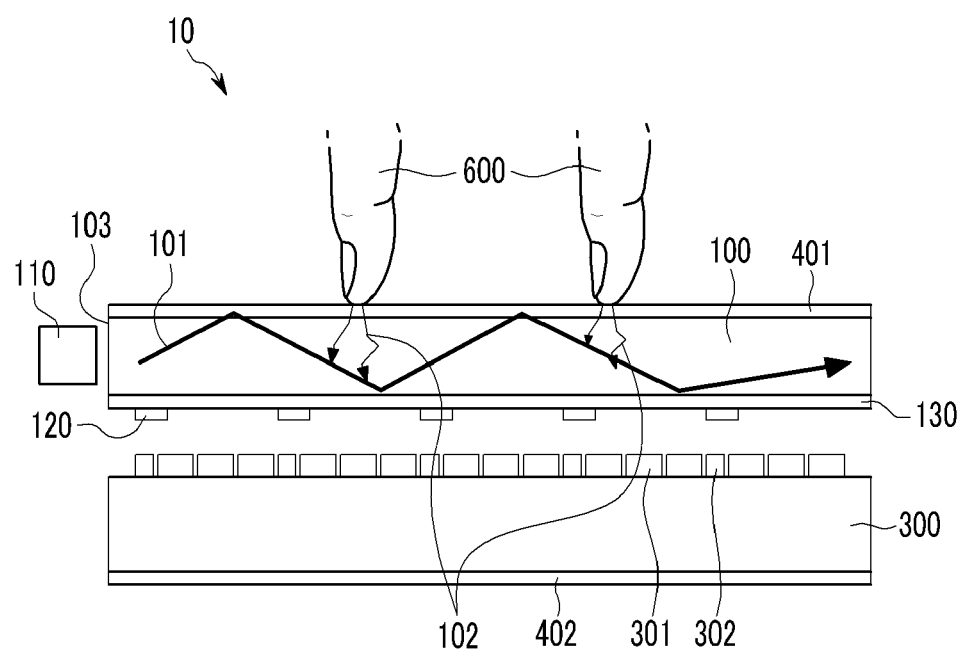

FIG. 12 is a cross-sectional view of a fifth embodiment of the object-sensing display device 10. This embodiment differs from the embodiment of FIG. 1 in that the radiation receiving elements 120 are positioned on the subsidiary layer 130 instead of the surface of the waveguide 100 opposite the radiation input surface 103. Instead of measuring the amount of radiation that is totally internally reflected to be transmitted across the waveguide 100 as in the embodiment of FIG. 1, the radiation receiving elements 120 receive the scattered radiation 102. The radiation that reaches the radiation receiving elements 120 is radiation that leaves the waveguide 100 via the bottom surface.

Figure 13:
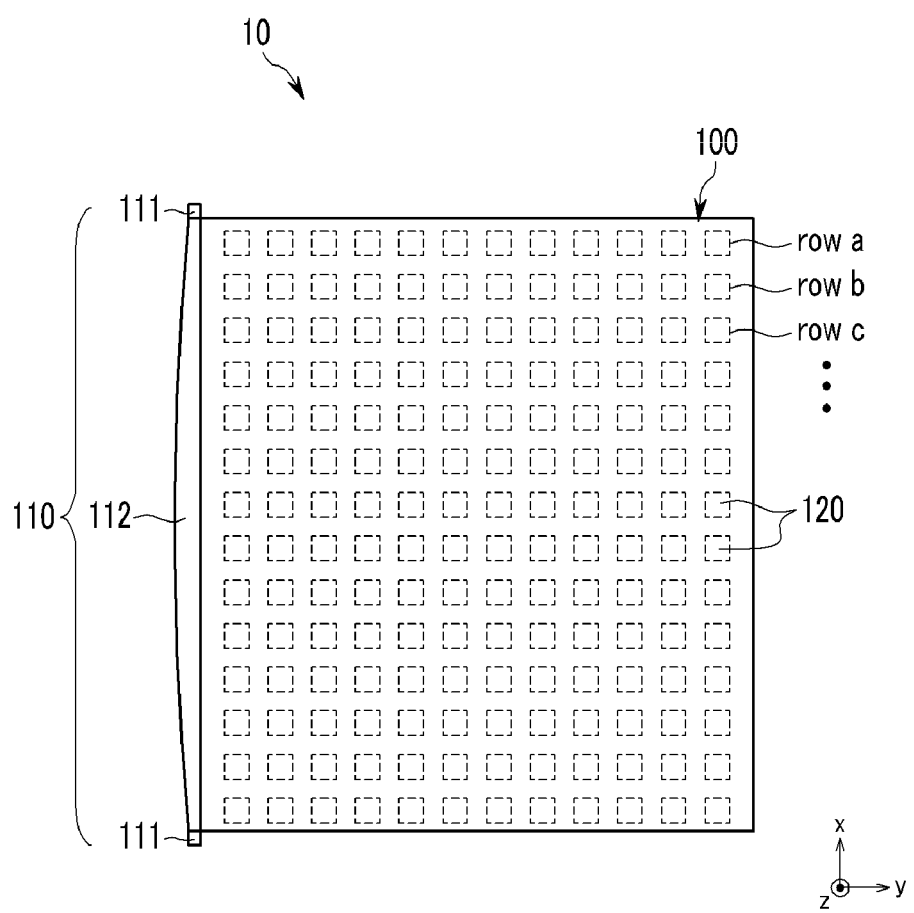
FIG. 13 is a plan view of a waveguide in an exemplary object-sensing display device.

FIG. 13 is a plan view of the waveguide 100 in an exemplary object-sensing display device 10. This view shows the radiation receiving elements 120 arranged on the waveguide 100 in a two-dimensional, matrix configuration. The number of radiation receiving elements 120 may be the same as or less than the number of pixels on the display device. The radiation emitting element 110 includes a radiation source 111, a radiation guide member 112, and a microlens (not shown) for directing the radiation in a desired direction. In this particular embodiment, the radiation sources 111 are at the corners of the waveguide 100 with the radiation guide member 112 extending between them. The radiation source 111 may be any device (light emitting diode, lamp, etc.) that emits wavelengths such as infrared rays of between about 850 nm and about 980 nm. The radiation emitted by the radiation sources 111 propagates in the y-direction via total internal reflection as shown in the coordinates by being distributed by the radiation guide member 112. The radiation travels across the waveguide 100, causing the radiation receiving elements 120 to receive a certain low (or zero) level of radiation in the absence of an object to cause scattering. When an object is present, causing the radiation to scatter, the scattered radiation is sensed by the radiation receiving element 120 at the location that corresponds to where the scattering occurred. The radiation receiving element 120, upon detecting radiation, forwards the intensity reading to a computer (not shown).

In the embodiment of FIG. 13, scanning may be performed on a row-by-row basis as in the embodiment of FIG. 3. In other words, row a will be activated, then row b, and then row c, from one end of the waveguide 100 to the other at a preselected frequency (e.g., 60 Hz). When an object presence is detected in row i, a group of radiation receiving elements 120 around the row i may be activated to determine exactly which radiation receiving element 120 received the maximum amount of scattered radiation. The "group" may be, for example, two rows above and below row i although this invention is not limited to any specific "group." The x- and y-coordinates can be determined based on the identification of the radiation receiving element 120 that received the maximum radiation.

The invention allows the location of multiple objects on the display surface to be detected simultaneously. This allows a user to make a selection by touching two points on an image simultaneously, providing more flexibility to the manner in which he can input information. The more densely the radiation receiving elements 120 are arranged, the more precisely the location(s) of the object(s) can be determined.

Figure 14:
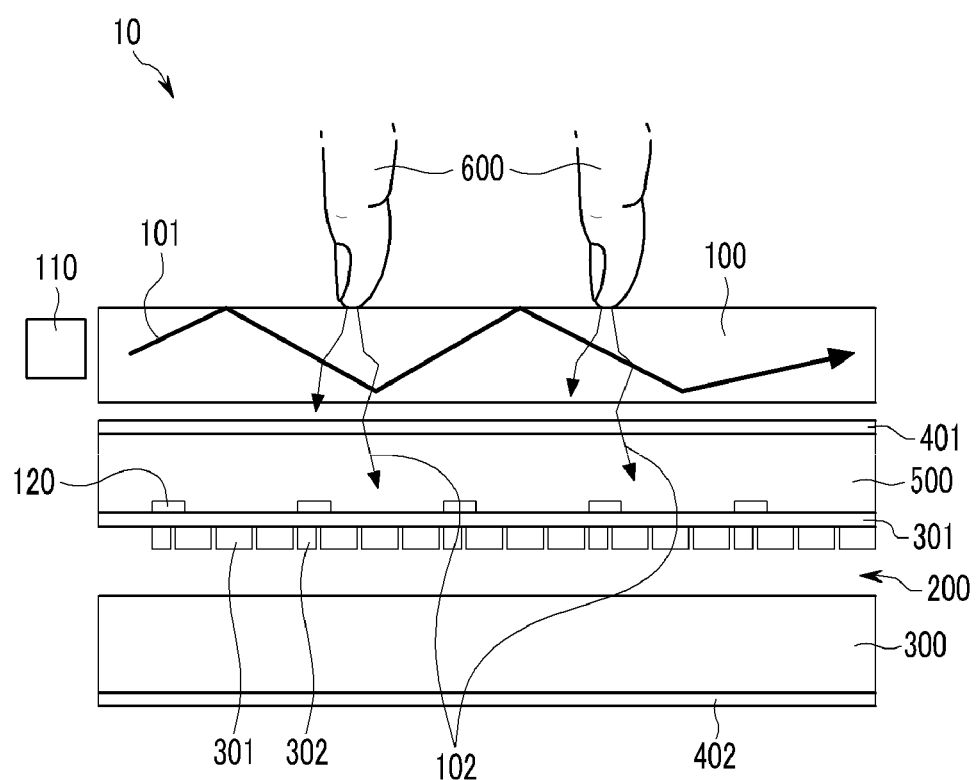

FIG. 14 is a cross-sectional view of a sixth embodiment of the object-sensing display device 10. The sixth embodiment is similar to the fifth embodiment shown in FIG. 12 except that there are three substrate layers instead of two, and the radiation receiving elements 120 are formed on the intermediate substrate 500. More specifically, this embodiment has a waveguide on top of a liquid crystal display that has two substrates. An intermediate substrate 500 and the TFT substrate 300 hold the liquid crystal layer 200, and the waveguide 100 is disposed on top of the intermediate substrate 500. The radiation receiving elements 120 are disposed on a color filter 301, preferably in a two-dimensional configuration (e.g., the matrix configuration of FIG. 13). The radiation receiving elements 120 receive the radiation that is scattered out of the waveguide 100 by the object(s) 600, and the radiation receiving elements 120 that receive the most radiation correspond to the location of the object(s) 600. Theoretically, as many objects 600 as the number of radiation receiving elements 120 may be detected simultaneously.

Figure 15:
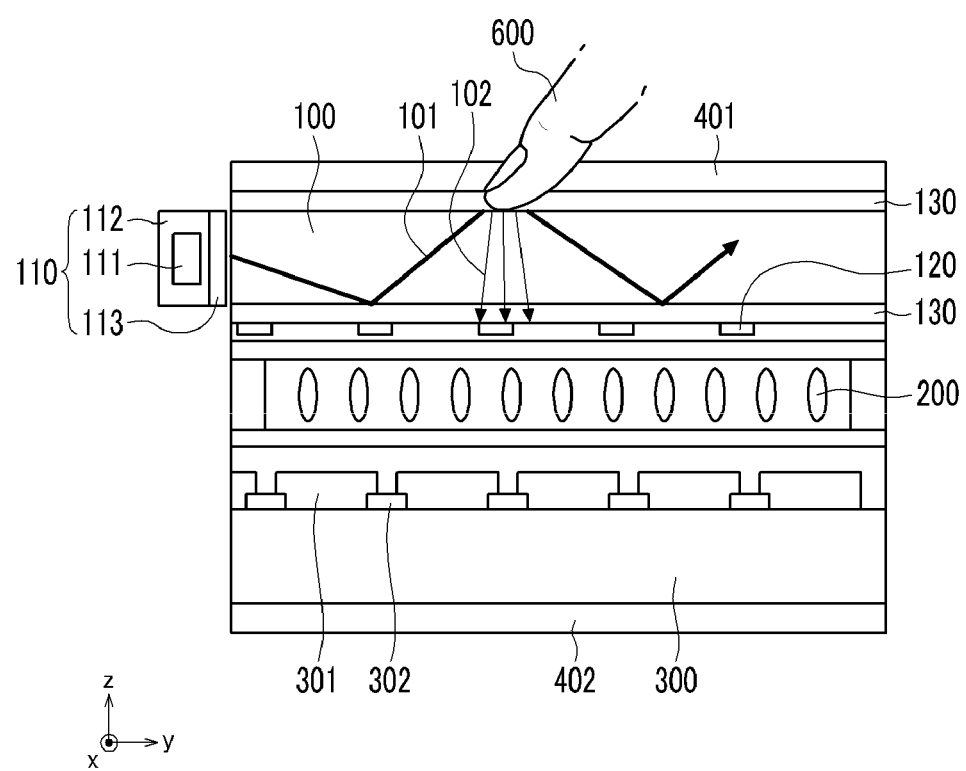

FIG. 15 is a cross-sectional view of an embodiment of the object-sensing display device 10 that shows details of the radiation emitting element 110. Specifically, the radiation emitting element 110 includes the radiation source(s) 111, the radiation guide member 112, and the micro lens 113 between the radiation source and the waveguide 100. The waveguide 100 and the TFT substrate 300 sandwich the liquid crystal layer 200, and the radiation sensing elements 120 are disposed between the subsidiary layer 130 and the liquid crystal layer 200. The radiation from the radiation emitting element 110 propagates through the waveguide 100 in the y-direction by total internal reflection. When an object 600 is present on the surface of the waveguide 100, the radiation gets scattered, causing the radiation receiving element 120 to receive a level of radiation above the baseline level when no object is present. The increased level of radiation is turned into a signal and forwarded to the computer (not shown) for processing and location determination.

Figure 16:
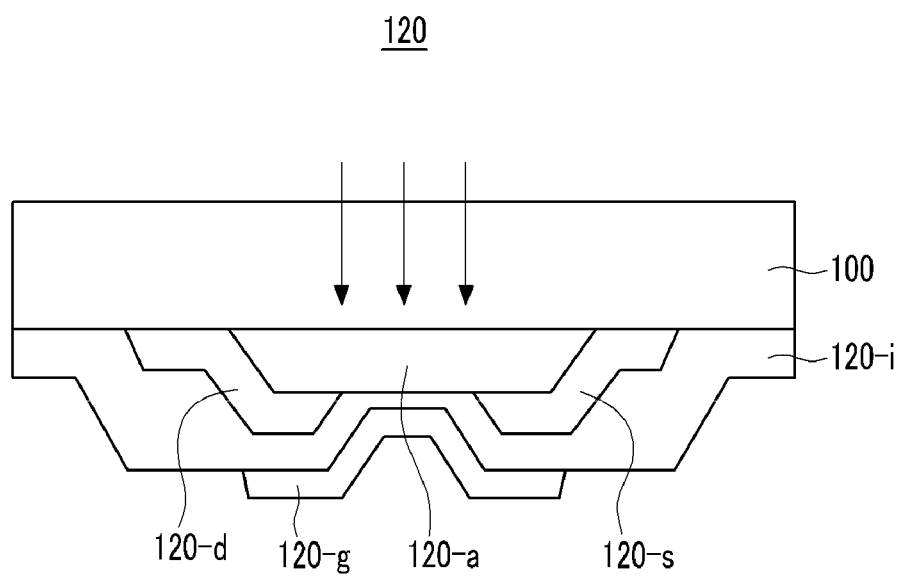
FIG. 16 is a cross-sectional view of a radiation receiving element formed on the waveguide via a thin film transistor fabrication process.

FIG. 16 is a cross-sectional view of a radiation receiving element 120 formed on the waveguide 100 via a thin film transistor fabrication process. Prior to forming any layers, a band pass filter may be formed to remove radiation of predetermined ranges. Then, using the waveguide 100 as a substrate, an active layer 120-$a$ is formed using a material such as Si or Si—Ge. An ohmic contact layer (not shown) may be formed on the active layer 120-$a$, and a radiation receiving source electrode 120-$s$ and drain electrode 120-$d$ are formed on the active layer 120-$a$. The radiation receiving source electrode 120-$s$ and the radiation receiving drain electrode 120-$d$ are covered with an insulation layer 120-I, and a radiation receiving gate electrode 120-$g$ is formed. Each of the radiation receiving elements 120 shown in FIG. 14, for example, may have the cross section shown in FIG. 16.

Figure 17:
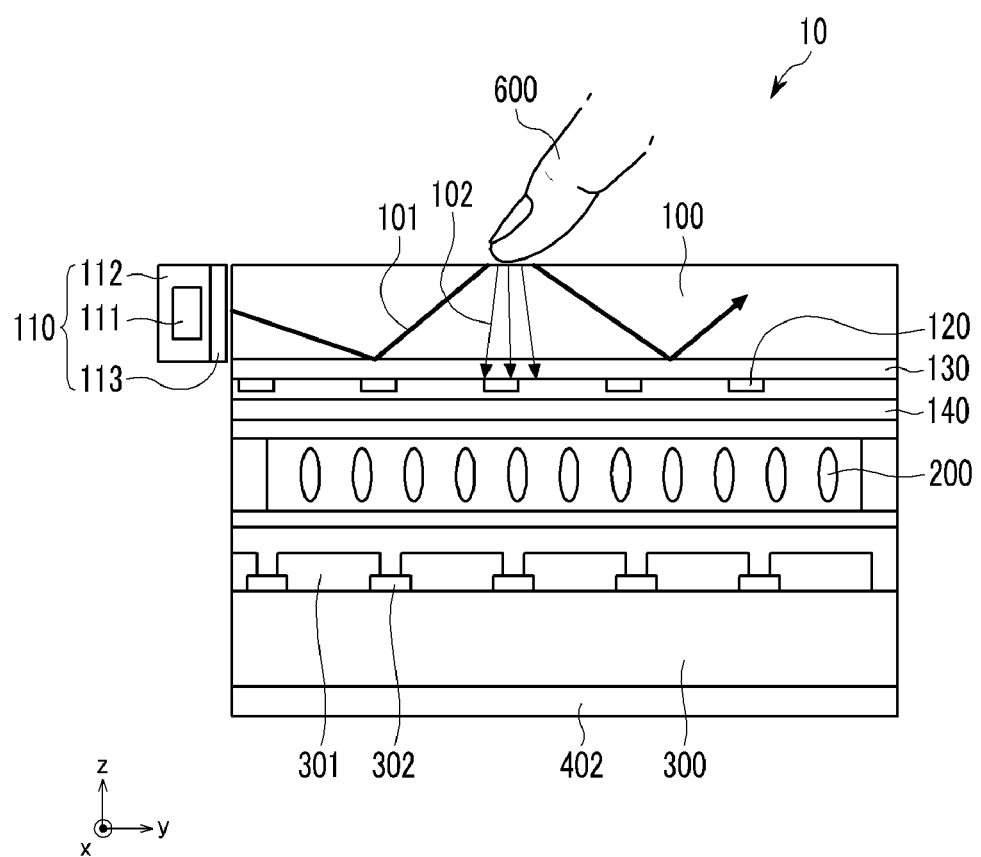

FIG. 17 is a cross-sectional view of an embodiment of the object-sensing display device 10. This embodiment is similar to the embodiment of FIG. 15 with the exception of an absorption polarizer 140.

Figure 18:
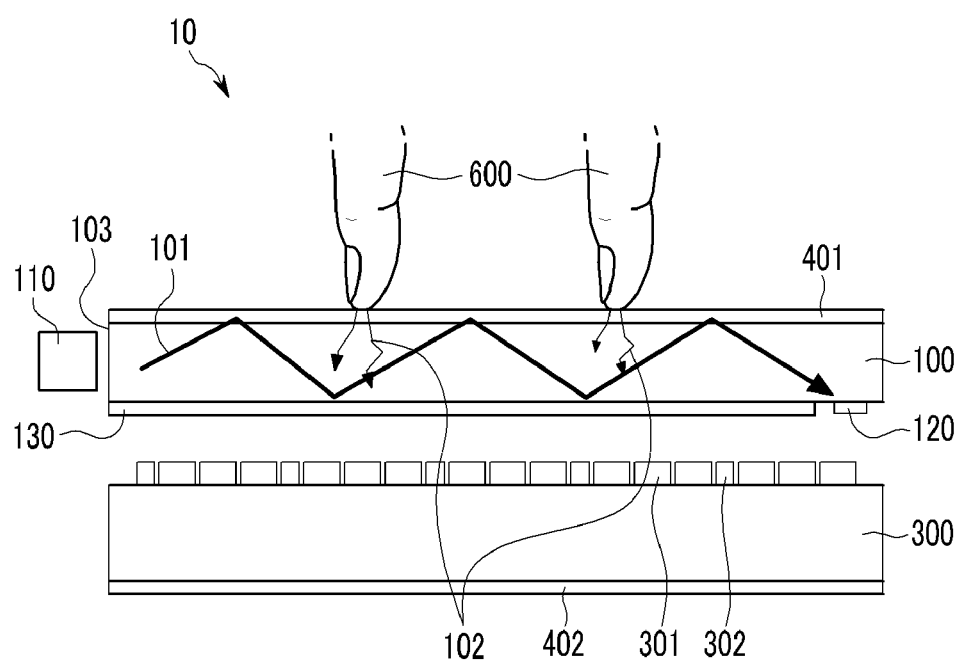
FIG. 18 is a cross-sectional view of an embodiment of the object-sensing display device.

FIG. 18 is also a cross-sectional view of an embodiment of the object-sensing display device 10. In this embodiment, the radiation receiving element 120 is disposed under the waveguide 100 and along with an edge of the waveguide 100. That is, the radiation receiving elements 120 are aligned in one direction along with one edge. Though this embodiment is similar to the embodiment of FIG. 11, the difference between two embodiments is that radiation receiving element 120 is disposed under the waveguide 100 in this embodiment. According to FIG. 18, though there is a gap between the radiation receiving element 120 and the subsidiary layer 130, the gap is not essential and according to embodiments, they may contact each other without a gap.

Although the foregoing invention has been described in some detail by way of illustration and examples for purposes of clarity and understanding, it will be apparent that modifications and alternative embodiments of the invention are contemplated which do not depart from the spirit and scope of the invention as defined by the foregoing teachings and appended claims.

What is claimed is:
1. An object-sensing display device comprising:
   a waveguide that transmits radiation via total internal reflection;
   a substrate for a display panel;
   a liquid crystal layer, the liquid crystal layer held between the substrate and the waveguide;
   a radiation emitting element positioned along a radiation input surface of the waveguide;
   a radiation receiving element positioned to receive radiation exiting the waveguide, and
   a computer receiving signals from the radiation receiving element to determine a position of the object on the waveguide, wherein the substrate and the waveguide do not have an intervening substrate for the display panel between them, and wherein the computer obtains data regarding intensity of radiation at various points along an x-direction, determines a y-coordinate of the object using a rate of intensity change in the x-direction, and determines an x-coordinate of the object, the x-coordinate of the object being a point in which the obtained intensity data have a point of inflection.

2. The object-sensing display device of claim 1, wherein the radiation receiving element is positioned along an edge of the waveguide and detects the amount of radiation that is transmitted through the waveguide via total internal reflection.

3. The object-sensing display device of claim 1, wherein the radiation receiving element is optically coupled to a surface of the waveguide that is substantially parallel to the radiation input surface.

4. The object-sensing display device of claim 1, wherein the radiation receiving element detects the amount of radiation that is scattered by an object on the waveguide.

5. The object-sensing display device of claim 4, wherein the radiation receiving element is optically coupled to a surface that contacts the radiation input surface.

6. The object-sensing display device of claim 4, wherein the radiation receiving element is optically coupled to a waveguide surface that is substantially perpendicular to the radiation input surface.

7. The object-sensing display device of claim 4, wherein the radiation receiving element is located between the waveguide and the liquid crystal layer.

8. The object-sensing display device of claim 4, wherein the radiation receiving element comprises a plurality of sensors arranged in a two-dimensional configuration.

9. the object-sensing display device of claim 8, wherein the radiation receiving element is arranged in a matrix configuration with each sensor corresponding to a pixel on the substrate.

10. The object-sensing display device of claim 1 further comprising a subsidiary layer disposed on the waveguide, the subsidiary layer having an index of refraction that is lower than that of the waveguide.

11. The object-sensing display device of claim 10, wherein the radiation receiving element is positioned on the subsidiary layer.

12. The object-sensing display device of claim 1, further comprising a black matrix layer formed on the substrate.

13. The object-sensing display device of claim 12, wherein a black matrix of the black matrix layer overlaps the radiation receiving element.

14. The object-sensing display device of claim 1, wherein the substrate comprises a thin film transistor array and pixels.

15. The object-sensing display device of claim 1, wherein the waveguide comprises one of an organic material, glass, or polymethyl methacrylate (PMMA).

16. The object-sensing display device of claim 1, wherein the waveguide has a thickness of 0.5-1 mm.

17. The object-sensing display device of claim 1, wherein the radiation receiving element is one of a photodiode, a phototransistor, a charge-coupled device (CCD), and a camera.

18. The object-sensing display device of claim 1, wherein the radiation receiving element is formed on the substrate.

19. An object-sensing device comprising:
a waveguide that transmits radiation via total internal reflection from a first end to a second end;
a substrate for a display panel;
a liquid crystal layer held between the substrate and the waveguide;
a radiation emitting element positioned at a first end of the waveguide;
a radiation receiving element positioned at a second end of the waveguide; and
a computer receiving signals from the radiation receiving element to determine a position of the object on the waveguide,
wherein edges of the waveguide that do not correspond to the first end or the second end are free of radiation emitting element and radiation receiving element,
wherein the substrate and the waveguide do not have an intervening substrate for the display panel between them, and
wherein the computer obtains data regarding intensity of radiation at various points along an x-direction, determines a y-coordinate of the object using a rate of intensity change in the x-direction, and determines an x-coordinate of the object, the x-coordinate of the object being a point in which the obtained intensity data have a point of inflection.

20. The object-sensing device of claim 19, wherein the radiation receiving element is positioned along an edge of the waveguide and detects the amount of radiation that is transmitted through the waveguide via total internal reflection.

21. The object-sensing device of claim 19, wherein the radiation receiving element is optically coupled to a surface of the waveguide that is substantially parallel to the radiation input surface.

22. The object-sensing device of claim 19 further comprising a subsidiary layer disposed on the waveguide, the subsidiary layer having an index of refraction that is lower than that of the waveguide.

23. An object-sensing display device comprising:
a waveguide that transmits radiation via total internal reflection from a first end to a second end;
a radiation emitting element positioned at a first end of the waveguide;
a radiation receiving element positioned at a second end of the waveguide, wherein edges of the waveguide that do not correspond to the first end or the second end are free of radiation emitting element and radiation receiving element;
a common electrode formed on the waveguide;
a thin film transistor array substrate for the display panel having pixel electrodes formed thereon, the thin film transistor array substrate being disposed on the common electrode with a liquid crystal layer between the pixel electrodes and the common electrode; and
a computer receiving signals from the radiation receiving element to determine a position of the object on the waveguide,
wherein the thin film transistor array substrate and the waveguide do not have an intervening substrate for the display panel between them, and
wherein the computer obtains data regarding intensity of radiation at various points along an x-direction, determines a y-coordinate of the object using a rate of intensity change in the x-direction, and determines an x-coordinate of the object, the x-coordinate of the object being a point in which the obtained intensity data have a point of inflection.

24. A non-transitory computer-readable medium containing instructions for executing a method for determining the location of an object on a surface in an x-y plane, the method comprising:
   obtaining data regarding intensity of radiation at various points along an x-direction;
   determining a y-coordinate of the object using a rate of intensity change in the x-direction; and
   determining an x-coordinate of the object, the x-coordinate of the object being a point in which the obtained intensity data have a point of inflection.

* * * * *